United States Patent
Hasegawa

(10) Patent No.: US 7,609,389 B2
(45) Date of Patent: Oct. 27, 2009

(54) MEASUREMENT APPARATUS FOR MEASURING SURFACE MAP

(75) Inventor: Saori Hasegawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 12/022,368

(22) Filed: Jan. 30, 2008

(65) Prior Publication Data

US 2008/0186510 A1 Aug. 7, 2008

(51) Int. Cl.
*G01B 11/02* (2006.01)

(52) U.S. Cl. .................................................. 356/512

(58) Field of Classification Search .......... 356/512–514
See application file for complete search history.

(56) References Cited

U.S. PATENT DOCUMENTS

| 5,488,477 | A | 1/1996 | de Groot |
| 5,986,760 | A | 11/1999 | Nakayama et al. |
| 7,289,222 | B1 | 10/2007 | Schuster |
| 2003/0030819 | A1 | 2/2003 | Kuechel |
| 2003/0184763 | A1 | 10/2003 | Ueki et al. |

FOREIGN PATENT DOCUMENTS

| EP | 1324006 A1 | 7/2003 |
| JP | 05-223537 | 8/1993 |

OTHER PUBLICATIONS

European Patent Office, European Search Report, Jul. 13, 2009.

*Primary Examiner*—Tarifur Chowdhury
*Assistant Examiner*—Jonathon D Cook
(74) *Attorney, Agent, or Firm*—Canon USA Inc IP Division

(57) ABSTRACT

A measurement apparatus for measuring a surface map comprises an image sensor, an optical system including a reference surface and arranged to form an interferogram of a reflected wavefront from a test surface and that from the reference surface on an image sensing surface of the image sensor and a calculation unit which calculates a surface map of the measurement target based on the interferogram. The calculation unit calculates the surface map of the measurement target by utilizing first data which expresses, by a first coordinate system, data in a state in which a central axis of the test surface is at a first angle to an optical axis of the optical system, and second data which expresses, by a second coordinate system obtained by shifting the first coordinate system, data in a state in which the central axis is at a second angle to the optical axis.

3 Claims, 12 Drawing Sheets

FIRST ANGULAR STATE

SECOND ANGULAR STATE

COORDINATE SYSTEM IN WHICH
NA IS UNIFORMLY DIVIDED

COORDINATE SYSTEM IN WHICH NA IS UNIFORMLY DIVIDED

COORDINATE SYSTEM IN WHICH
NA IS UNIFORMLY DIVIDED

3

COORDINATE SYSTEM IN WHICH
NA IS UNIFORMLY DIVIDED

MEASUREMENT APPARATUS FOR MEASURING SURFACE MAP

BACKGROUND OF THE INVENTION

1. Field of the Invention

The present invention relates to a measurement apparatus for measuring a surface map (surface shape).

2. Description of the Related Art

Japanese Patent No. 3146590 discloses a prior art of acquiring map data while moving the test surface of a measurement target, and separating the test surface from a system error map by using the acquired map data.

FIG. 2 shows the first measurement position. The first measurement position is set at a position where an optical axis 11 of an optical system, the central position of a test surface 2, and a central axis 10 of the test surface 2 which extends through the center of curvature coincide with each other. FIG. 3 shows the second measurement position. At the second measurement position, the test surface 2 is inclined along a circular arc, that is, the central axis 10 of the test surface 2 is inclined from the optical axis 11 of the optical system by γ.

First, at the first measurement position, the first rotation averaged map is obtained as an average of a plurality of pieces of map data acquired by rotating the test surface. This corresponds to the sum of a system error map and the rotationally invariant components of the test surface.

At the second measurement position, the second rotation averaged map is obtained as an average of a plurality of pieces of map data acquired by rotating the test surface. This corresponds to the sum of the system error map and the rotationally invariant components of the test surface.

When calculating the difference between the first rotation averaged map and second rotation averaged map, the system error map is eliminated, and the difference between the rotationally invariant components of the test surface is obtained. The rotationally invariant components of the map are calculated utilizing the nature of the concentric contours of the rotationally invariant components.

The method of calculating the rotationally invariant components utilizing the nature of the concentric contours will be described with reference to FIG. 4. In FIG. 4, solid lines represent a first rotation averaged map RI1, and broken lines represent a second rotation averaged map RI2. Positions on the same radius of each line form a concentric contour. Positions A and B, and C and D are respectively indicated as RI1A and RI1B on the same contours of the first rotation averaged map. Positions B and D, and A and C are respectively indicated as RI2A and RI2B on the same contours of the second rotation averaged map. FIG. 4 shows the difference between the first rotation averaged map and second rotation averaged map. Accordingly, A, B, C, and D are respectively expressed as RI1A-RI2B, RI1A-RI2A, RI1B-RI2B, and RI1B-RI2A. As four unknowns RI1A, RI1B, RI2A, and RI2B yield three equations, RI1B, RI2A, and RI2B can be obtained with reference to RI1A. When performing the same operation for the entire surface, the rotationally invariant components of the test surface can be obtained.

SUMMARY OF THE INVENTION

It is an object of the present invention to provide a measurement apparatus for measuring a surface map which can measure accurately by canceling an error that results from a change in perspective from an image sensor when the central axis of a test surface is inclined.

According to the present invention, there is provided a measurement apparatus for measuring a surface map according to the present invention is characterized by comprising: an image sensor;

an optical system including a reference surface and arranged to form an interferogram of a reflected wavefront from a test surface of a measurement target and that from the reference surface on an image sensing surface of the image sensor; and a calculation unit which calculates a surface map of the measurement target based on the interferogram, wherein the calculation unit calculates the surface map of the measurement target by utilizing first data which expresses, by a first coordinate system, data on an image taken by the image sensor in a state in which a central axis of the test surface is at a first angle to an optical axis of the optical system, and second data which expresses, by a second coordinate system obtained by shifting the first coordinate system, data on an image taken by the image sensor in a state in which the central axis of the test surface is at a second angle to the optical axis of the optical system.

The present invention can provide a measurement apparatus for measuring a surface map which can measure accurately by canceling an error that results from a change in perspective from an image sensor when the central axis of a test surface is inclined.

Further features or aspects of the present invention will become apparent from the following description of exemplary embodiments with reference to the attached drawings.

DESCRIPTION OF THE EMBODIMENTS

An image sensor for acquiring a map of a test surface has a flat image sensing surface, and a plurality of pixels are arranged on the image sensing surface at common pixel pitches. In such an image sensor, the image of the map of the test surface is taken with a coordinate system in which the Numerical Aperture (NA) of a spherical wave that irradiates the test surface is uniformly divided. Hence, in this specification, the coordinate system in which the image sensing surface of the image sensor is divided such that the NA becomes uniform will be referred to as a "coordinate system in which a NA is uniformly divided".

If the test surface is a spherical surface and an image is to be acquired with the coordinate system in which the NA is uniformly divided, the nature of the concentric circles of the rotationally invariant components cannot be utilized.

Figure 8:
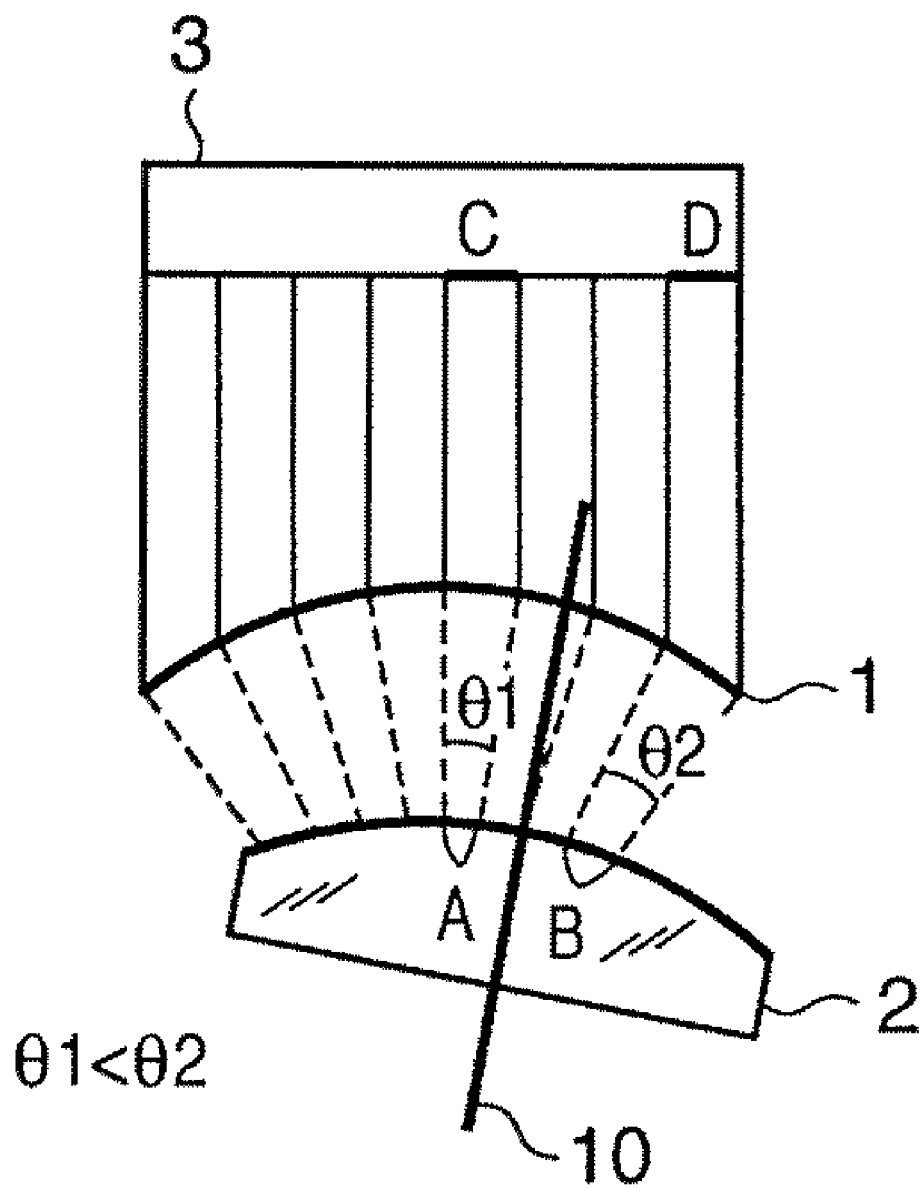
FIG. 8 is a diagram which schematically shows an image sensor, reference surface, and test surface and in which an imaging system is not illustrated and the interferogram acquired by the image sensor is the one obtained on a coordinate system in which the NA of the reference surface is divided uniformly.

The reason why the nature of the concentric circles of the rotationally invariant components cannot be utilized when the image data on the coordinate system in which the NA is uniformly divided acquired by the image sensor is to be employed unchanged will be described with reference to FIG. 8. FIG. 8 schematically shows an image sensor 3, reference surface 1, and test surface 2. An imaging system is not illustrated. For example, note the positions A and B on the test surface. A is a point on the reference surface which is closer to the optical axis of the optical system than to the central axis 10 of the test surface at the second measurement position, and B is a point closer to a marginal ray than to the central axis 10 of the test surface. A and B are at equal distances from the central axis 10 of the test surface. Those pixels of the image sensor which are used to acquire information on the positions A and B are a pixel C and a pixel D, respectively. The pixel pitches of C and D are equal. The distances of the circular arcs of A and B are different, however, and A and B are respectively expressed as R1×θ1 and R1×θ2 where R1 is the radius of curvature of the reference surface 1. Accordingly, the length of the circular arc of the test surface to be acquired by one pixel differs from one pixel to another in accordance with the distance from the optical axis 11 of the optical system.

Figure 2:
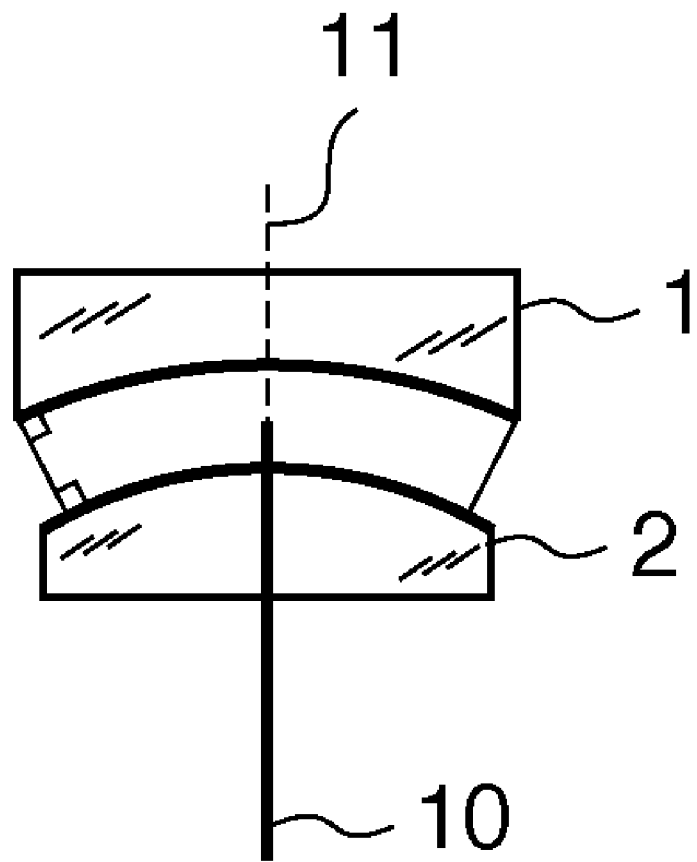
FIG. 2 is a diagram showing a state in which the central axis of a test surface coincides with and forms a first angle with the optical axis of an optical system.
Figure 3:
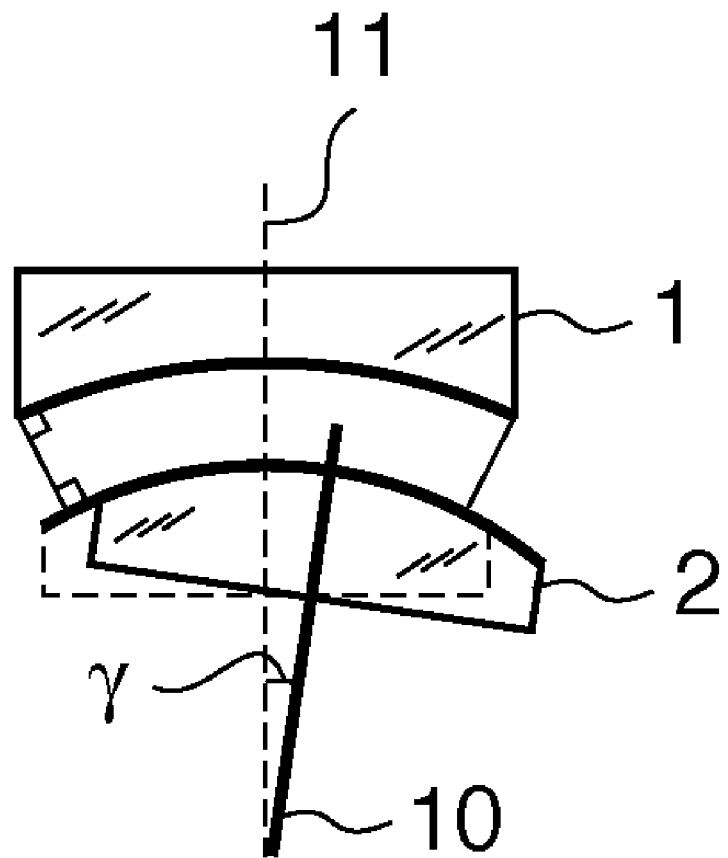
FIG. 3 shows a state in which the test surface is inclined along a circular arc, that is, the central axis of the test surface is inclined with respect to the optical axis of the optical system by γ and forms a second angle with it.
Figure 4:
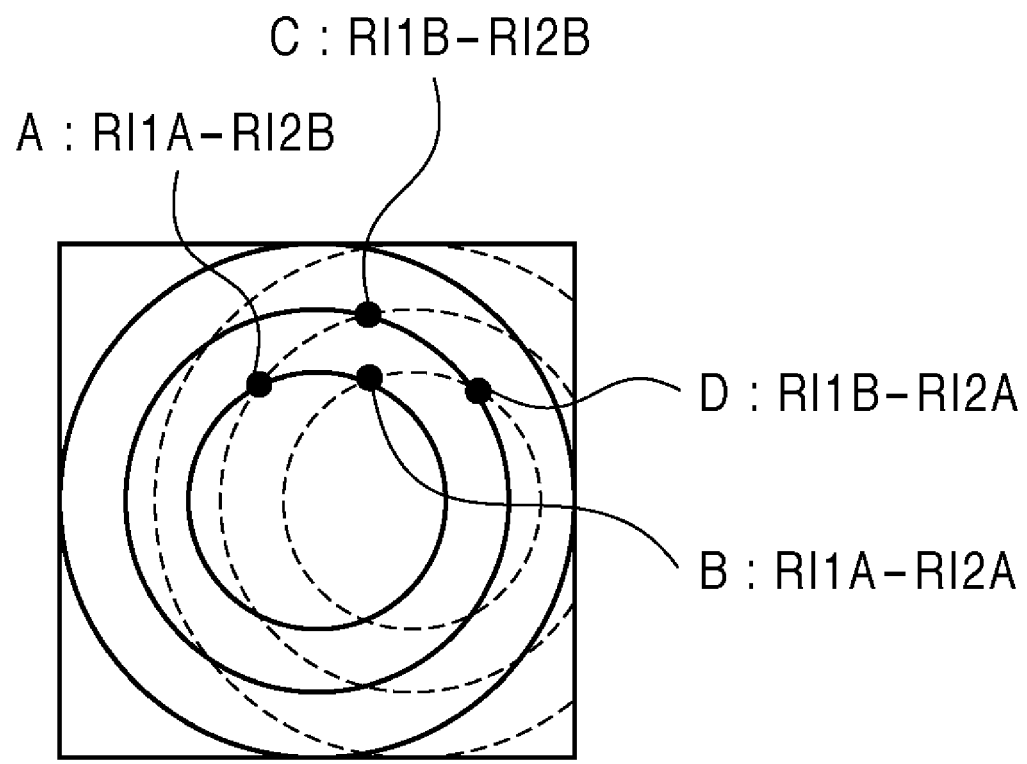
FIG. 4 is a diagram of arithmetic operation utilizing the nature of concentric contours.
Figure 5:
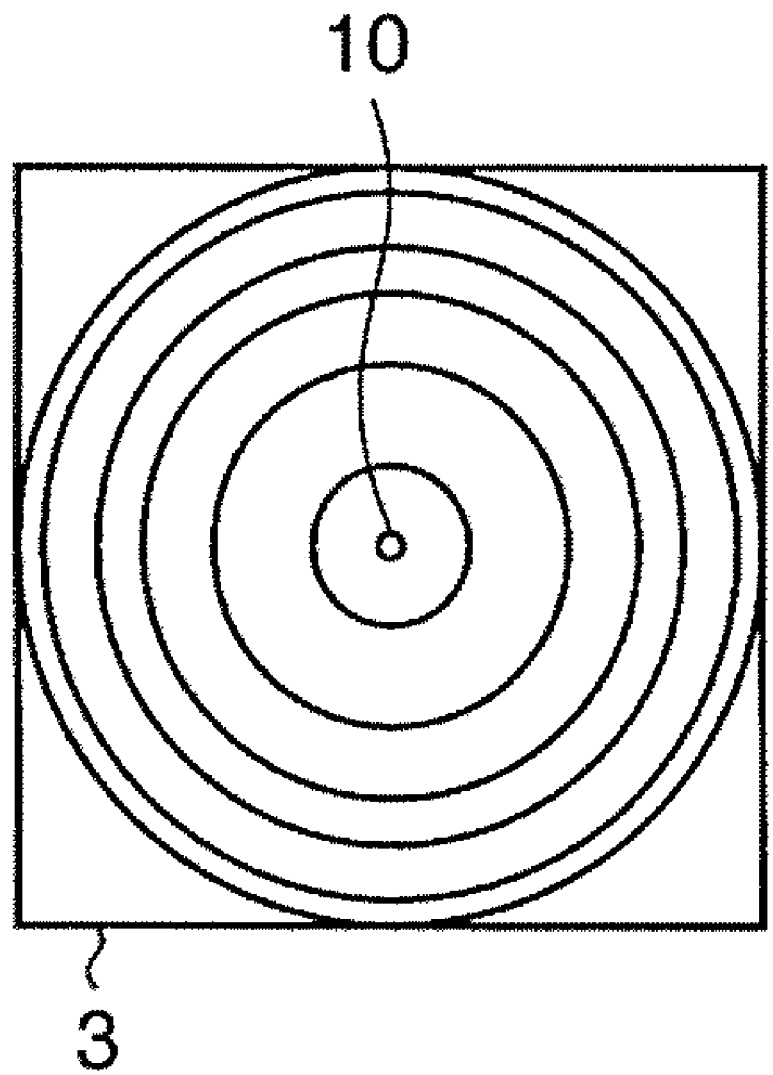
FIG. 5 is a diagram in the first angular state in which same-radius positions about the rotation axis as the center are drawn on the coordinate system in which the NA is uniformly divided.
Figure 6:
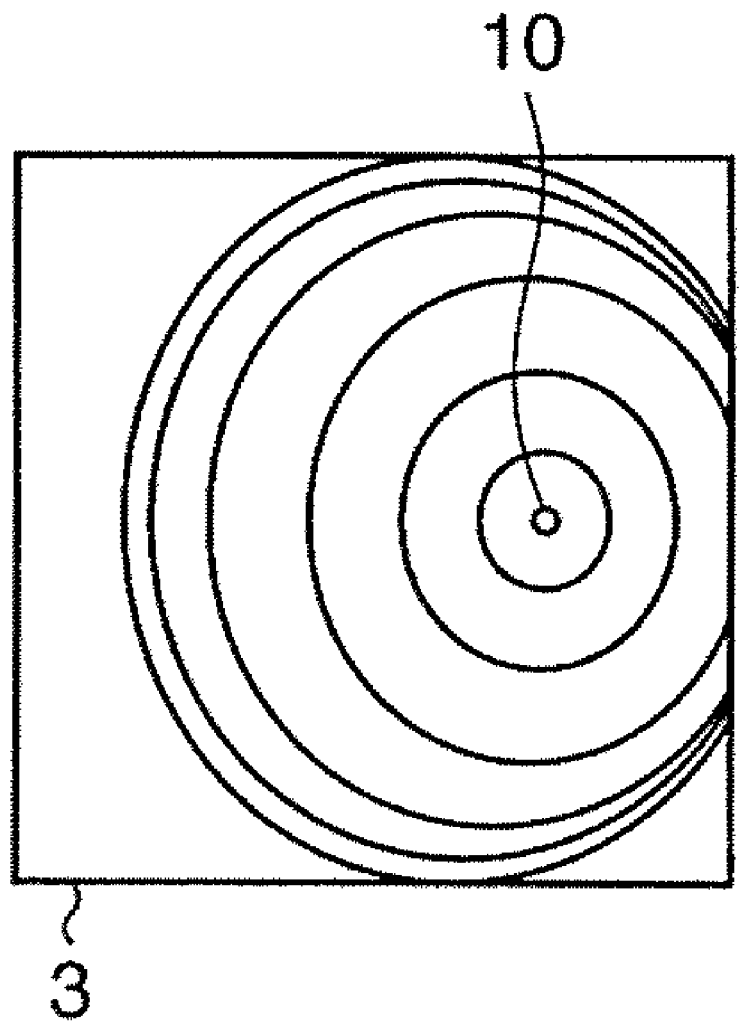
FIG. 6 is a diagram in the second angular state in which same-radius positions about the rotation axis as the center are drawn on the coordinate system in which the NA is uniformly divided.
Figure 7:
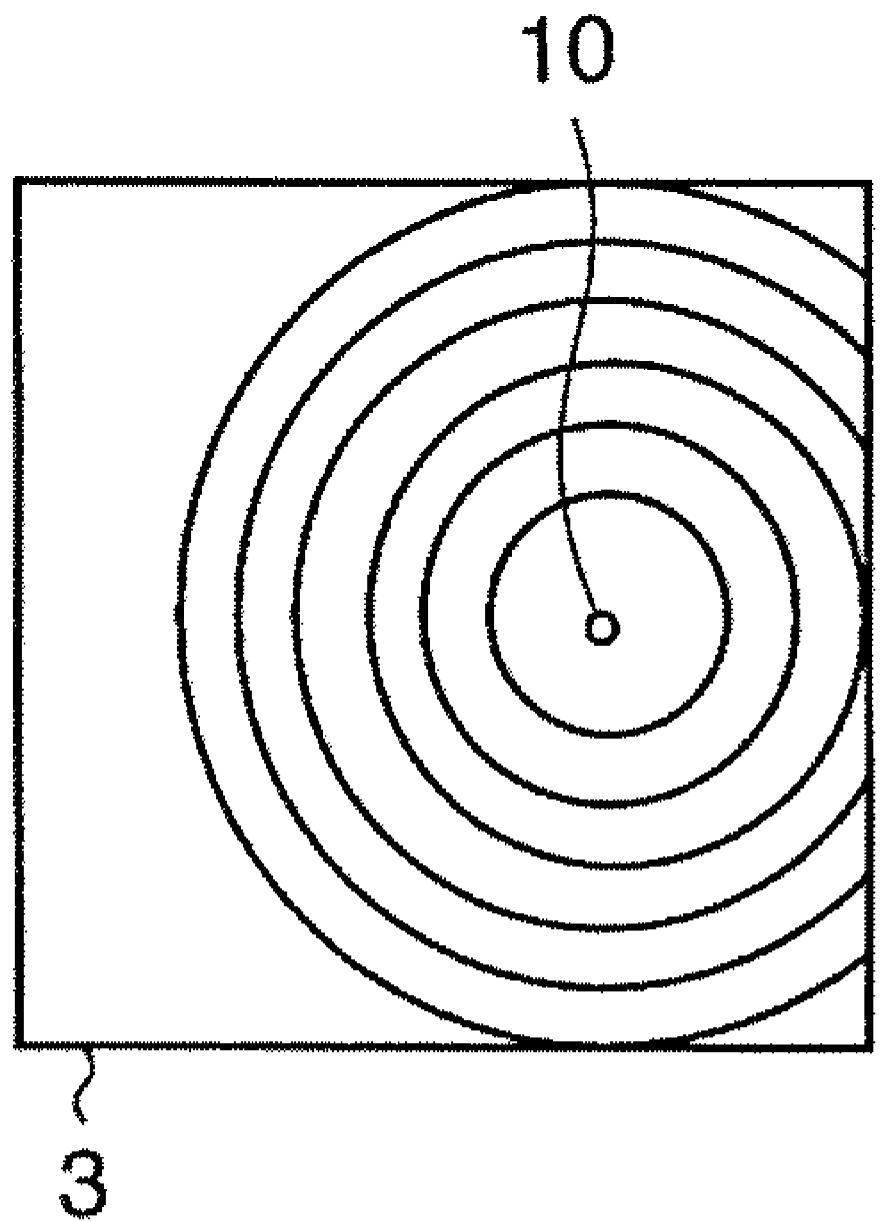
FIG. 7 is a diagram of concentric circles drawn in the second angular state.

The reason why the nature of the concentric circles of the rotationally invariant components cannot be utilized will be described with reference to FIGS. 5 to 7. FIGS. 5 to 7 show only the rotationally invariant components of the test surface for the sake of simplicity. The circular lines show those positions on the test surface which are at the same radii from the central axis 10 of the test surface and uniformly divide the radius. In the first angular state and second angular state, the interferogram of the reflected wavefront from the test surface and that from the reference surface are respectively as shown in FIGS. 5 and 6. In the first angular state, as shown in FIG. 2, the central axis 10 of the test surface coincides with the optical axis 11 of the optical system. In the second angular state, as shown in FIG. 3, the central axis 10 of the test surface is inclined with respect to the optical axis 11 of the optical system by the angle γ. These interferograms are acquired from the image sensor to obtain the map data. In the case of the first angular state, although the same-radius, equal-pitch positions on the test surface do not appear at equal-pitch positions on the image sensor 3, they can be expressed as same-radius positions, that is, concentric contours. FIG. 5 shows such contours.

In the case of the second angular state, the distance from the central axis 10 of the test surface is smaller on the side close to the marginal ray than on the side close to the optical axis of the optical system. Hence, as shown in FIG. 6, the same-radius, equal-pitch positions on the test surface do not appear at equal-pitch positions on the image sensor, and the contours do not become concentric.

Therefore, when the rotation axis does not coincide with the optical axis of the optical system, the same-radius, equal-pitch positions on the test surface form distorted circles on the image sensor 3 as in FIG. 6. If such positions are considered as concentric equal-pitch positions, as shown in FIG. 7, and the rotationally invariant components are calculated, an error resulting from the image sensor occurs. The scheme described as the background art requires measurement at least at two locations, that is, in the first angular state and the second angular state, and employs the image data acquired on the coordinate system in which the NA is uniformly divided unchanged. Hence, the problem of this error occurs inevitably.

Figure 9:
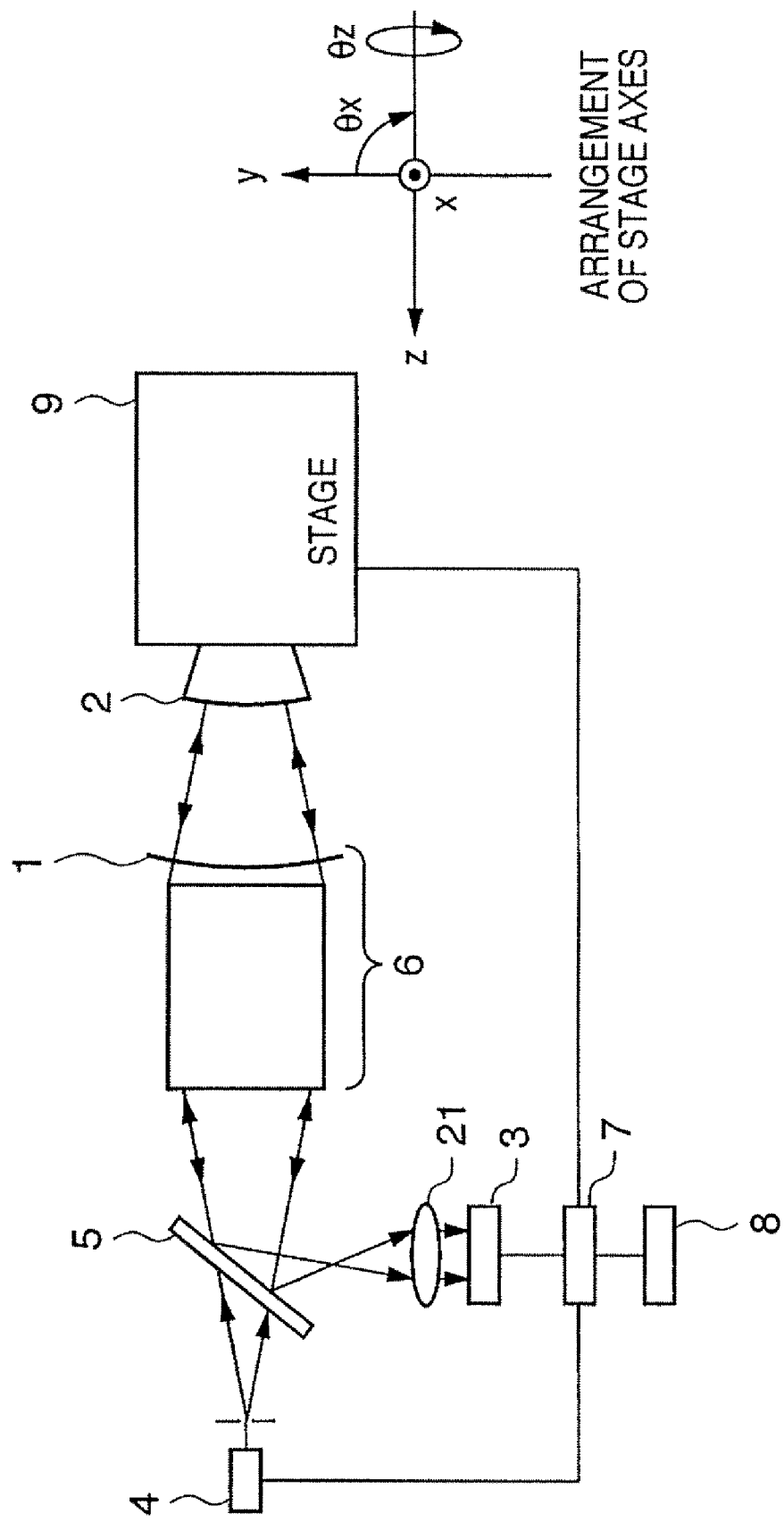
FIG. 9 shows a Fizeau interferometer according to an example of a measurement apparatus for measuring a surface map of the present invention.

A measurement apparatus for measuring a surface map according to an embodiment of the present invention will be described with reference to the accompanying drawings. The measurement apparatus for measuring a surface map of this embodiment shown in FIG. 9 employs a Fizeau interferometer system. In this embodiment, the surface as the test surface of a measurement target is spherical.

This Fizeau interferometer system comprises a light source 4, a half mirror 5, a Fizeau lens 6 including a reference surface 1, an imaging lens 21, an image sensor 3, a control unit 7, a processing unit 8, and a stage 9 to move the measurement target. The light source 4, half mirror 5, and Fizeau lens 6 constitute an optical system. This optical system is arranged to irradiate a test surface 2 of the measurement target with a spherical wave and form an interferogram of the reflected wavefront from the test surface 2 and that from the reference surface 1 on the image sensing surface of the image sensor 3. The image sensing surface of the image sensor 3 is flat, and a plurality of pixels are arranged on the image sensing surface at common pixel pitches.

The stage 9 includes an x stage, a y stage, a z stage, a θz stage which rotates the measurement target about the z-axis as the rotation axis, and a θx stage which inclines the measurement target with respect to the center of curvature of the measurement target as the axis. The control unit 7 controls the light source 4, image sensor 3, and stage 9, and exchanges data with the processing unit 8. The processing unit 8 has the function of storing the interferogram acquired by the image sensor 3 and the function of calculating the map of the test surface on the basis of the interferogram. Hence, the processing unit 8 also serves as a calculation unit which calculates the map of the test surface. The Fizeau lens 6 converts coherent light into a spherical wave.

First, the measurement target is set in the first state shown in FIG. 2 in which the central axis 10 of the test surface coincides with and forms a first angle with the optical axis 11 of the optical system. The measurement target in the first angular state is irradiated with coherent light, so the image sensor 3 obtains the interferogram of the reflected wavefronts from both the test surface and reference surface. A plurality of pieces of map data are acquired while rotating the measurement target using the θz-axis of the stage 9. The acquired data are averaged to obtain the first data in the first angular state.

The first data is the sum of a system error map and the first rotation averaged map of the test surface.

Then, by shifting the θx-axis of the stage 9, the measurement target is set in the state in which the test surface shown in FIG. 3 is inclined along a circular arc, that is, in the second angular state in which the central axis 10 of the test surface is inclined with respect to the optical axis 11 of the optical system by γ and forms a second angle with it. The test surface 2 in the second angular state is irradiated with coherent light to obtain the interferogram of the reflected wavefronts from both the reference surface 1 and test surface 2. A plurality of pieces of map data are acquired while rotating the measurement target using the θz-axis of the stage 9. The acquired data are averaged to obtain the second data in the second angular state. The second data is the sum of the system error map and the second rotation averaged map of the test surface.

Figure 10:
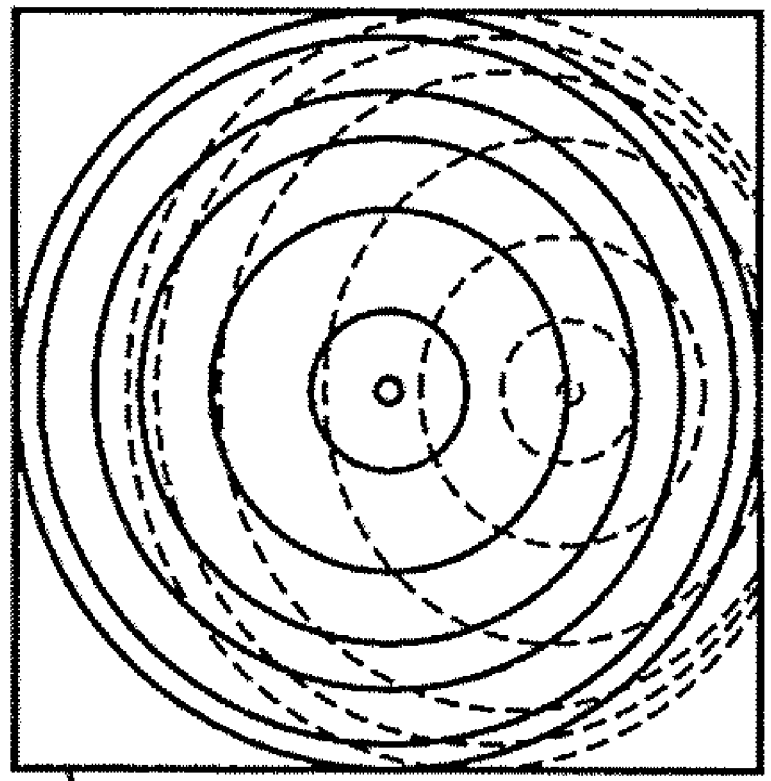
FIG. 10 shows the first rotation averaged map and second rotation averaged map on the coordinate system in which the NA is uniformly divided.

When the third data as the difference between the first data and second data is obtained, the system error map is canceled in the third data. Hence, the map information on the test surface and the system error map are separated from each other. The third data corresponds to the difference between the first rotation averaged map and second rotation averaged map of the test surface, and can be expressed by only the rotationally invariant components of the test surface. FIG. 10 shows the third data expressed by only the rotationally invariant components of the test surface. Solid lines represent the first rotation averaged map, and broken lines represent the second rotation averaged map. The contours of the second rotation averaged map are distorted.

Figure 12:
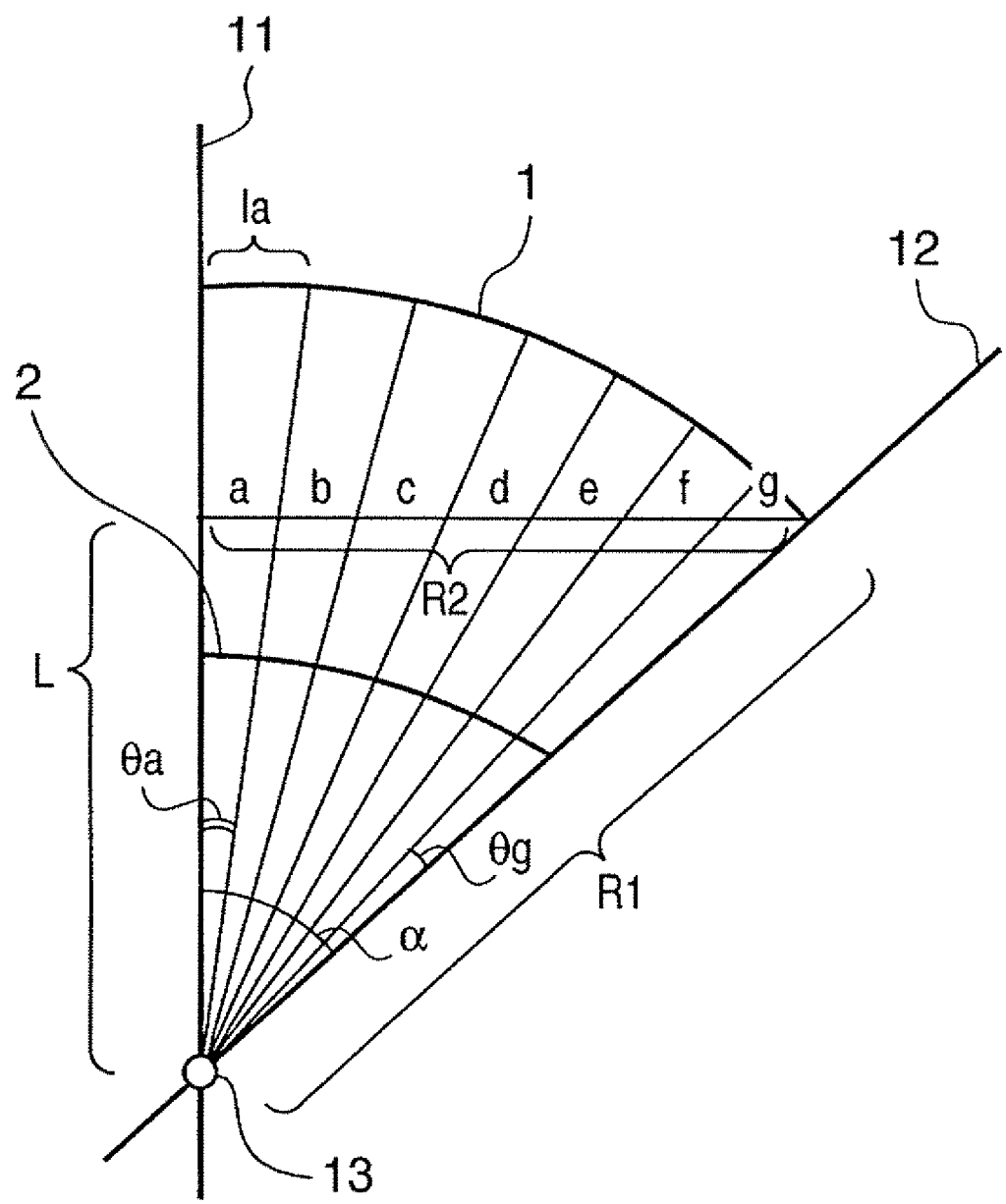
FIG. 12 is a sectional view of the reference surface and test surface within a scope between the optical axis of the optical system and a marginal ray.

On the coordinate system of the first and second data, the arrangement of the pixel is acquired by the image sensors on the basis of the coordinate system in which the NA is uniformly divided. Accordingly, the third data as the difference between the first and second data are also data on the basis of the coordinate system in which the NA is uniformly divided. The coordinate system in which the NA is uniformly divided will further be described with reference to FIG. 12. FIG. 12 is a sectional view of the reference surface 1 and test surface 2 and schematically shows the scope between the optical axis 11 of the optical system and a marginal ray 12 on one side. Reference numeral R1 represents the radius of curvature of the reference surface 1; and R2, the radius of a measurable region of the reference surface 1. Reference symbol L represents the length from the intersection point of the optical axis 11 of the optical system and R2 to a center 13 of radius. Reference symbols a to g respectively represent the lengths of segments obtained by uniformly dividing R2 into seven; and Ia represents the length of that circular arc of the reference surface 1 which corresponds to a. Reference symbols θa and θg represent angles respectively corresponding to a and g when dividing an angle α formed by the optical axis 11 of the optical system and the marginal ray 12 to uniformly divide R2 into a to g. The NA (Numerical Aperture) is determined by the reference surface, and is expressed as NA=sin α=R2/R1 in the case of FIG. 12. As R2 is divided into seven (seven pixels) in FIG. 12, angles (angles obtained by dividing α into a to g) for the pixels at this time are as follows:

$\theta a = \text{atan}(1 \times R2/(7 \times L))$ $\theta b = \text{atan}(2 \times R2/(7 \times L)) - \text{atan}(1 \times R2/(7 \times L))$

. . .

$\theta g = \text{atan}(7 \times R2/(7 \times L)) - \text{atan}(6 \times R2/(7 \times L))$ The distances of the respective pixels on the reference surface are {Ia, Ib, . . . Ig}={R1×θa, R1×θb, . . . R1×θg}. The angles θa to θg are different, and θa>θg. Therefore, the distances Ia to Ig on the reference surface are also different. Hence, the length of the circular arc of the test surface acquired by one pixel of the image sensor 3 is determined by the distance from the optical axis 11 of the optical system, and differs from one pixel to another.

Figure 1:
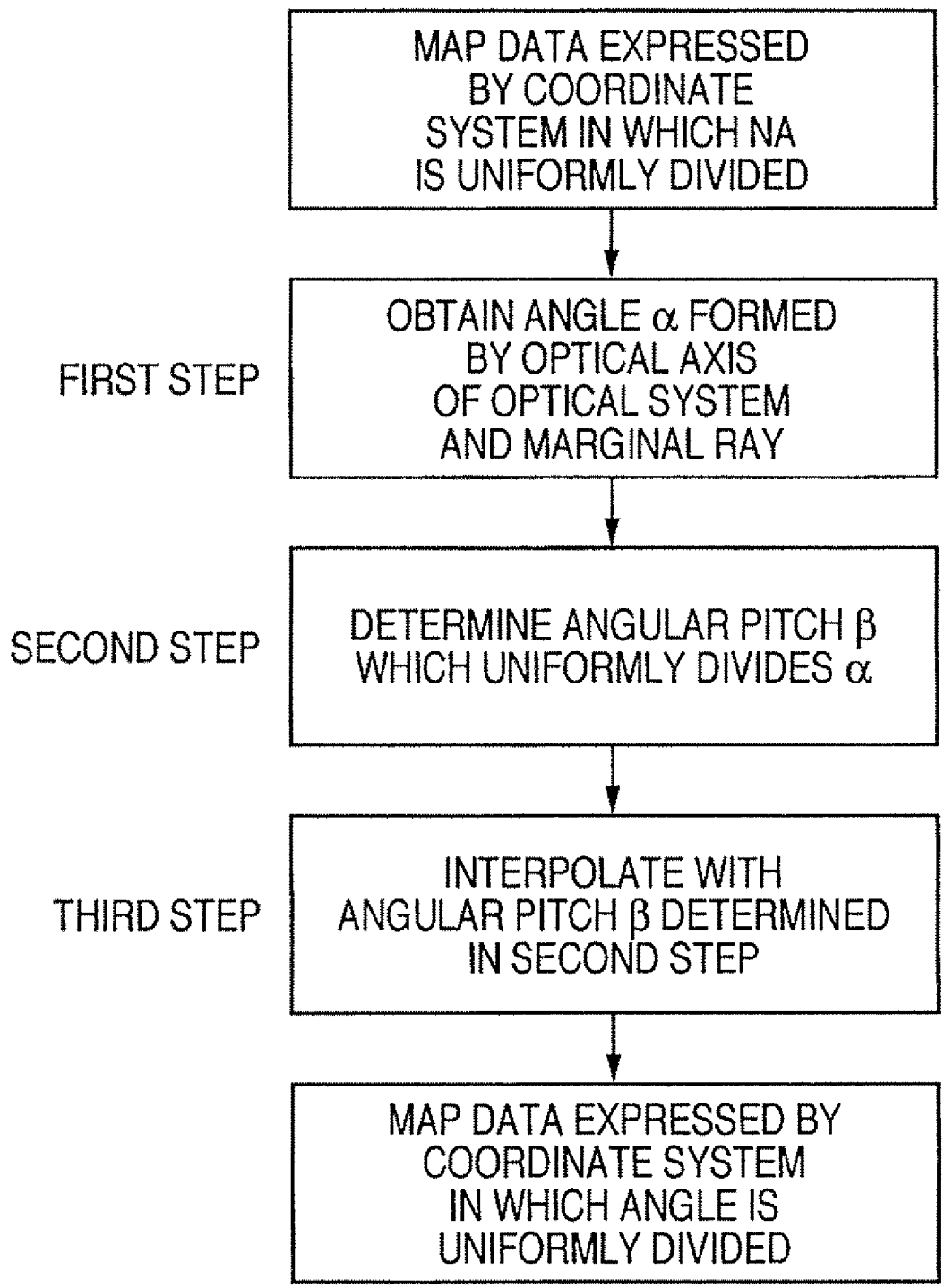
FIG. 1 is a flowchart showing steps of converting a coordinate system in which a NA is uniformly divided into a coordinate system in which an angle is uniformly divided.

FIG. 1 shows the steps of converting the coordinate system in which the NA is uniformly divided into a coordinate system in which unit scales uniformly divide the angle formed by the optical axis 11 of the optical system and the marginal ray 12. In this specification, a coordinate system in which the angle formed by the optical axis 11 of the optical system and the marginal ray 12 is uniformly divided will be referred to as a "coordinate system in which an angle is uniformly divided".

In the first step, the processing unit (calculation unit) 8 obtains the angle α formed by the optical axis 11 of the optical system and the marginal ray 12. The angle α is determined by the curvature and diameter of the reference surface, and satisfies α=asin(R2/R1) in the case of the reference surface in FIG. 12.

In the second step, the processing unit (calculation unit) 8 determines an angular pitch β that uniformly divides α. At this time, $\beta = \text{asin}(R2/R1)/n_\beta = \alpha/n_\beta$ is satisfied where $n_\beta$ is the number of divisions. In order not to lose information on the map data obtained on the coordinate system in which the NA is uniformly divided, the angular pitch β need only be the smallest angle (β=θg in the case of FIG. 12) for all the pixels. Alternatively, β may be determined in accordance with the calculation processing ability and object such that an arbitrary number of pixels are obtained.

In the third step, the processing unit (calculation unit) 8 calculates map data corresponding to the coordinate system in which the angle is uniformly divided, that is, the angle formed by the optical axis of the optical system and the marginal ray 12 is uniformly divided with the angular pitch β determined in the second step. The original pixels corresponding to the coordinate system in which the NA is uniformly divided are {Ia, Ib, . . . Ig}={R1×θa, R1×θb . . . R1×θg} on the reference surface. With the angular pitch β determined in the second step, the pixels corresponding to the coordinate system in which the angle is uniformly divided are {Ia', Ib', . . . Ig'}={R1×β, R1×β, . . . R1×β} on the reference surface. In this manner, interpolation is performed such that all the distances for the corresponding pixels on the reference surface become equal to R1×β, thus acquiring map data on the coordinate system in which the angle is uniformly divided.

In this manner, the first data and second data expressed by the coordinate system in which the angle is uniformly divided can be respectively obtained from the first data and second data in the first angular state and second angular state which are expressed by the coordinate system in which the NA is uniformly divided. In this case, the first data expressed by the coordinate system in which the angle is uniformly divided is the first data expressed by the first coordinate system, and the second data expressed by the coordinate system in which the angle is uniformly divided is the second data expressed by the second coordinate system. The two coordinate systems in each of which an angle is uniformly divided, and which express the first data and second data are shifted from each other.

Although the coordinate system in which the angle is uniformly divided is employed as the first coordinate system and second coordinate system in this embodiment, the coordinate system in which the NA is uniformly divided can be employed instead. As described above, data in the first angular state and data in the second angular state of images which are taken by the image sensor 3 are both expressed by the coordinate system in which the NA is uniformly divided. As is apparent from a comparison of FIGS. 2 and 3, however, the degree of inclination of the central axis of the test surface with respect to the optical axis of the optical system differs between the two states, i.e., the first angular state and the second angular state, and accordingly, the perspective of the image sensor differs. When performing calculation considering the fact that the perspective of the image sensor differs, the surface map can be calculated directly from the data expressed by the coordinate system in which the NA is uniformly divided, without converting the data so as to be expressed by the coordinate system in which the angle is uniformly divided.

Figure 11:
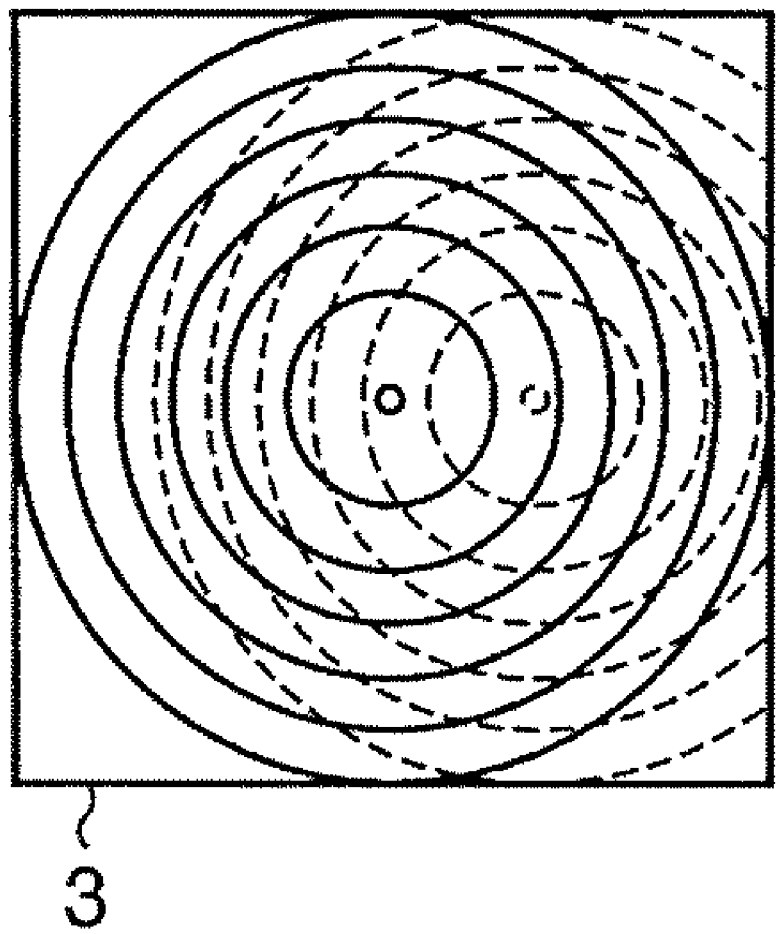
FIG. 11 shows the first rotation averaged map and second rotation averaged map on a coordinate system in which an angle is uniformly divided.

If the NA of the test surface is smaller than that of the reference surface, coordinate conversion into the coordinate system in which the angle is uniformly divided may be performed only for that portion of the test surface which is within the scope of the NA. With the above coordinate conversion, the contours (FIG. 10) of the data which are distorted because the same-radius, equal-pitch contours on the test surface are acquired by the image sensor form concentric equal-pitch contours (FIG. 11). The rotationally invariant components of the test surface are calculated by employing the nature of the concentric contours.

Alternatively, after the rotationally invariant components are calculated, the grid of the coordinate system in which the angle is uniformly divided may be interpolated into the grid of the coordinate system in which the NA is uniformly divided, thus restoring the state as acquired by the image sensor.

In this embodiment, the first angular state is a state in which the central axis 10 of the test surface coincides with the optical axis 11 of the optical system. Even if the first angular state is not such a state, calculation may be performed by similar coordinate conversion.

This embodiment is exemplified by a Fizeau interferometer. However, the present invention is not limited to this, but can similarly be applied to any other interferometer called an amplitude divided interferometer.

This embodiment is exemplified by a calculation that obtains the rotationally invariant components of the test surface. However, the present invention is not limited to this, but can also be applied to any measurement that uses map data obtained in the first angular state and second angular state.

This embodiment exemplifies a case in which calculation is performed using the map data obtained in the first angular state and second angular state. However, the present invention is not limited to this, but can also be applied to a case in which map data obtained in three or more angular states are employed.

In this embodiment, the map data is obtained while rotating the test surface, thereby eliminating information on the rotationally variant components of the test surface (the information is limited to the sum of the system error map and the rotationally invariant components of the test surface). If the rotational variance of the test surface is known in advance, the rotationally variant components of the test surface may be subtracted from those in each angular state. In the calculation of subtracting the rotationally variant components, note that the coordinate conversion process of the present invention is performed.

When an optical component measured by the measurement apparatus for measuring a surface map according to the present invention is employed in the projection optical system or illumination optical system of an exposure apparatus, an exposure apparatus with a better performance than in the conventional case can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-028442, filed Feb. 7, 2007, which is hereby incorporated by reference herein in its entirety.

What is claimed is:

1. A measurement apparatus for measuring a surface map, the apparatus comprising:
   an image sensor;
   an optical system including a reference surface and arranged to form an interferogram of a reflected wavefront from a test surface of a measurement target and that from said reference surface on an image sensing surface of said image sensor; and
   a calculation unit which calculates a surface map of the measurement target based on the interferogram,
   wherein said calculation unit calculates the surface map of the measurement target by utilizing first data which expresses, by a first coordinate system, data on an image taken by said image sensor in a state in which a central axis of the test surface is at a first angle to an optical axis of said optical system, and second data which expresses, by a second coordinate system obtained by shifting the first coordinate system, data on an image taken by said image sensor in a state in which the central axis of the test surface is at a second angle to the optical axis of said optical system,
   wherein each of the first coordinate system and the second coordinate system comprises a coordinate system in which an angle is uniformly divided, that is, a unit scale is equal to an angle obtained by uniformly dividing an angle formed by the optical axis of said optical system and a marginal ray.

2. The apparatus according to claim 1, wherein the state of the first angle comprises a state in which the central axis of the test surface coincides with the optical axis of said optical system.

3. The apparatus according to claim 1, wherein a surface of the measurement target comprises a spherical surface.

* * * * *